United States Patent
Tran et al.

(10) Patent No.: US 9,869,365 B2
(45) Date of Patent: Jan. 16, 2018

(54) ISOLATOR FOR USE WITH ENGINE THAT IS ASSISTED OR STARTED BY AN MGU OR A MOTOR THROUGH AN ENDLESS DRIVE MEMBER

(71) Applicant: Litens Automotive Partnership, Woodbridge (CA)

(72) Inventors: Hao Tran, North York (CA); Andrew M. Boyes, Aurora (CA); Boris Replete, Toronto (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 157 days.

(21) Appl. No.: 14/914,562

(22) PCT Filed: Aug. 27, 2014

(86) PCT No.: PCT/CA2014/000659
§ 371 (c)(1),
(2) Date: Feb. 25, 2016

(87) PCT Pub. No.: WO2015/027325
PCT Pub. Date: Mar. 5, 2015

(65) Prior Publication Data
US 2016/0201757 A1      Jul. 14, 2016

Related U.S. Application Data

(60) Provisional application No. 61/870,624, filed on Aug. 27, 2013, provisional application No. 61/992,884, (Continued)

(51) Int. Cl.
*F16F 15/123*      (2006.01)
*F02N 11/04*       (2006.01)
(Continued)

(52) U.S. Cl.
CPC ........ *F16F 15/12353* (2013.01); *F02N 11/04* (2013.01); *F16D 3/10* (2013.01);
(Continued)

(58) Field of Classification Search
CPC ................ F16F 15/12353; F16H 55/36; F16H 2055/366; B60K 25/02; B60K 2025/022;
(Continued)

(56) References Cited

U.S. PATENT DOCUMENTS 3,890,803 A    6/1975  Neal et al.
5,393,266 A    2/1995  Braun et al.
(Continued)

FOREIGN PATENT DOCUMENTS

DE      9417045 U      2/1995
DE      19511188 C2    11/1998
(Continued)

OTHER PUBLICATIONS

Riementrieb und Komponenten, KRAFTHAND Profi Werkstatt-PRAXIS, p. 16, 2011.
(Continued)

*Primary Examiner* — William E Dondero
*Assistant Examiner* — Robert T Reese
(74) *Attorney, Agent, or Firm* — Millman IP, Inc.

(57) ABSTRACT

In an aspect, an isolator is provided for isolating a device driven by an engine via an endless drive member. The isolator includes a shaft adapter that is connectable with a shaft of the device, a rotary drive member that is engageable with the endless drive member, a first isolation spring arrangement that is positioned to transfer torque between the shaft adapter and the rotary drive member, and a position-based damping structure. The damping structure is positioned to transfer torque via a frictional damping force between the rotary drive member and the shaft adapter at a
(Continued)

selected amount of relative movement therebetween. The selected amount of relative movement is selected to be less than a maximum permitted amount of flexure of the first isolation spring arrangement.

10 Claims, 12 Drawing Sheets

Related U.S. Application Data filed on May 13, 2014, provisional application No. 62/008,361, filed on Jun. 5, 2014.

(51) Int. Cl.
| | |
|---|---|
| F16H 55/36 | (2006.01) |
| F16D 3/10 | (2006.01) |
| F16D 3/14 | (2006.01) |
| F16F 15/14 | (2006.01) |
| F02B 67/06 | (2006.01) |
| B60K 25/02 | (2006.01) |

(52) U.S. Cl.
CPC ............ *F16D 3/14* (2013.01); *F16F 15/1428* (2013.01); *F16H 55/36* (2013.01); *B60K 2025/022* (2013.01); *F02B 67/06* (2013.01); *F16H 2055/366* (2013.01)

(58) Field of Classification Search
CPC ... F02N 11/04; F16D 3/10; F16D 3/14; F16D 3/66; F16D 13/76; F16D 41/206; F02B 67/06
See application file for complete search history.

(56) References Cited

U.S. PATENT DOCUMENTS

| | | | |
|---|---|---|---|
| 5,517,957 A | 5/1996 | Wagner et al. | |
| 6,394,248 B1* | 5/2002 | Monahan | F16D 41/206 |
| | | | 192/41 S |
| 7,070,033 B2 | 7/2006 | Jansen et al. | |
| 7,275,630 B2 | 10/2007 | Jansen et al. | |
| 7,708,661 B2 | 5/2010 | Pflug et al. | |
| 8,641,563 B2 | 2/2014 | Mende et al. | |
| 9,046,133 B2* | 6/2015 | Marion | B60K 25/02 |
| 9,291,253 B1 | 3/2016 | Alexander et al. | |
| 2006/0240926 A1 | 10/2006 | Wiesneth et al. | |
| 2007/0066426 A1* | 3/2007 | Kamdem | F16D 41/206 |
| | | | 474/94 |
| 2008/0139351 A1 | 6/2008 | Pflug et al. | |
| 2008/0194339 A1 | 8/2008 | Antchak et al. | |
| 2008/0312014 A1 | 12/2008 | Stief et al. | |
| 2009/0121401 A1* | 5/2009 | Lehmann | F16D 3/66 |
| | | | 267/215 |
| 2009/0211871 A1 | 8/2009 | Hartmann et al. | |
| 2011/0263365 A1 | 10/2011 | Mende et al. | |
| 2013/0217524 A1* | 8/2013 | Antchak | F02B 67/06 |
| | | | 474/94 |
| 2015/0027844 A1* | 1/2015 | Serkh | F16D 7/022 |
| | | | 192/75 |
| 2015/0072813 A1* | 3/2015 | Yoon | F16H 55/36 |
| | | | 474/94 |
| 2016/0091048 A1* | 3/2016 | Tran | F16H 55/36 |
| | | | 474/94 |

FOREIGN PATENT DOCUMENTS

| | | |
|---|---|---|
| DE | 102005062318 A1 | 7/2007 |
| DE | 102006019877 A1 | 10/2007 |
| DE | 102006039362 A1 | 3/2008 |
| DE | 102006039363 A1 | 3/2008 |
| DE | 102007034538 A1 | 1/2009 |
| DE | 102009006354 A1 | 8/2009 |
| DE | 102009039989 A1 | 4/2010 |
| DE | 102009014203 A1 | 9/2010 |
| DE | 102010011831 A1 | 9/2011 |
| DE | 102011104135 A1 | 12/2011 |
| DE | 102010047929 A1 | 4/2012 |
| DE | 102010047930 A1 | 4/2012 |
| DE | 102011086093 A1 | 9/2012 |
| DE | 102011081931 A1 | 3/2013 |
| DE | 102011086280 A1 | 5/2013 |
| DE | 102012216116 A1 | 6/2013 |
| EP | 2148109 B1 | 1/2012 |
| WO | 2007074016 A1 | 7/2007 |
| WO | 2008022897 A1 | 2/2008 |
| WO | 2008067915 A1 | 6/2008 |
| WO | 2008071306 A1 | 6/2008 |
| WO | 2009013071 A1 | 1/2009 |
| WO | 2012061936 A1 | 4/2010 |
| WO | 2011127898 A1 | 10/2011 |
| WO | 2012000470 A1 | 1/2012 |
| WO | 2012061930 A1 | 5/2012 |
| WO | 2012075984 A1 | 6/2012 |

OTHER PUBLICATIONS

PCT/CA2014/000659, International Search Report, dated Nov. 12, 2014.

* cited by examiner

US 9,869,365 B2

ISOLATOR FOR USE WITH ENGINE THAT IS ASSISTED OR STARTED BY AN MGU OR A MOTOR THROUGH AN ENDLESS DRIVE MEMBER

CROSS-REFERENCE TO RELATED APPLICATIONS

This application claims priority to U.S. Provisional Patent Application No. 61/870,624 filed Aug. 27, 2013, U.S. Provisional Patent Application No. 61/992,884 filed May 13, 2014, and U.S. Provisional Patent Application No. 62/008,361 filed Jun. 5, 2014, the contents of all of which are incorporated herein in their entirety.

FIELD

This disclosure relates to isolators and in particular to isolators that are used on an engine crankshaft or on a motor-generator unit (MGU) shaft in vehicles in which the engine can be started or boosted by the MGU through a belt (e.g. an engine equipped with a belt-alternator start (BAS) drive system).

BACKGROUND

Isolators are known devices that are installed on engine crankshafts and on accessory drive shafts for reducing the transmission of torsional vibrations from the crankshaft to a belt driven by the crankshaft. While a traditional isolator is useful in many vehicular applications, some isolators do not perform ideally in applications wherein the belt is sometimes used to transmit torque to the crankshaft, for example as part of a Belt-Assisted Start (BAS) drive system wherein an electric motor is used to drive the belt in order to drive the crankshaft for the purpose of starting the engine.

It would be advantageous to provide an isolator that is configured for use in vehicles with BAS drive systems or the like.

SUMMARY

In an aspect, an isolator is provided for isolating a device driven by an engine via an endless drive member. The isolator includes a shaft adapter that is connectable with a shaft of the device, a rotary drive member that is engageable with the endless drive member, a first isolation spring arrangement that is positioned to transfer torque between the shaft adapter and the rotary drive member, and a position-based damping structure. The damping structure is positioned to transfer torque via a frictional damping force between the rotary drive member and the shaft adapter at a selected amount of relative movement therebetween. The selected amount of relative movement is selected to be less than a maximum permitted amount of flexure of the first isolation spring arrangement.

In another aspect, an isolator is provided for isolating a device driven by an engine via an endless drive member. The isolator includes a shaft adapter that is connectable with a shaft of the device, a rotary drive member that is engageable with the endless drive member, a first isolation spring arrangement that is positioned to transfer torque between the shaft adapter and the rotary drive member, and a damping structure. The damping structure is positioned to transfer torque via a frictional damping force between the rotary drive member and the shaft adapter at a selected amount of relative movement therebetween, wherein the damping structure includes a first spreader member and first and second force transfer members, wherein the selected amount of relative movement between the rotary drive member and the shaft adapter drives the spreader member circumferentially into engagement with the force transfer members, which in turn transfer force from the spreader member into an axial force on first and second friction members respectively to generate the damping force.

BRIEF DESCRIPTION OF THE DRAWINGS

The foregoing and other aspects will now be described by way of example only with reference to the attached drawings, in which.

DETAILED DESCRIPTION OF EXAMPLE EMBODIMENTS

Figure 1:
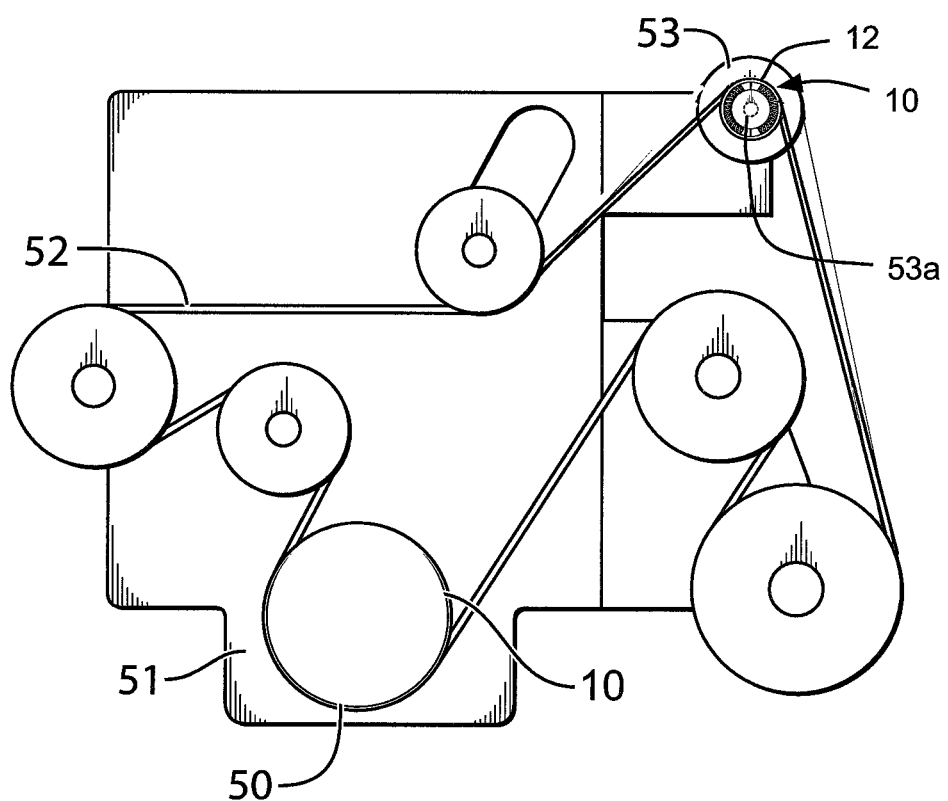
FIG. 1 is a side view of an engine in a vehicle containing an isolator on a shaft of an MGU (motor-generator unit), in accordance with an embodiment of the present invention.

Reference is made to FIG. 1, which shows an isolator 10 for transferring power between an endless drive member 52, such as an accessory drive belt, that is driven by a crankshaft pulley 50 mounted on a crankshaft 50a of an engine 51, and a shaft 53a of an MGU (motor-generator unit) 53, in accordance with an embodiment of the present invention. The isolator 10 isolates the MGU 53 from torsional vibrations in the endless drive member 52 that commonly occur in internal combustion engines. The endless drive member 52 may be referred to as a belt for convenience, however, any suitable endless drive member may be used.

The isolator 10 is useful in any engine, but is particularly useful in an engine that incorporates a BAS (belt-alternator start) system, in which the engine 51 is initially started normally (e.g. using a starter motor) but is shut down for brief periods (e.g. while the vehicle is at a stoplight) and then restarted by driving the crankshaft 50a via the belt 52. The belt 52 would be driven by the MGU 53. Alternatively, the MGU 53 may be replaced by an alternator and a separate motor may be used to drive the belt 52 during BAS events.

BAS technology is becoming increasingly common in an effort to increase fuel economy of vehicles and reduce emissions.

Figure 2:
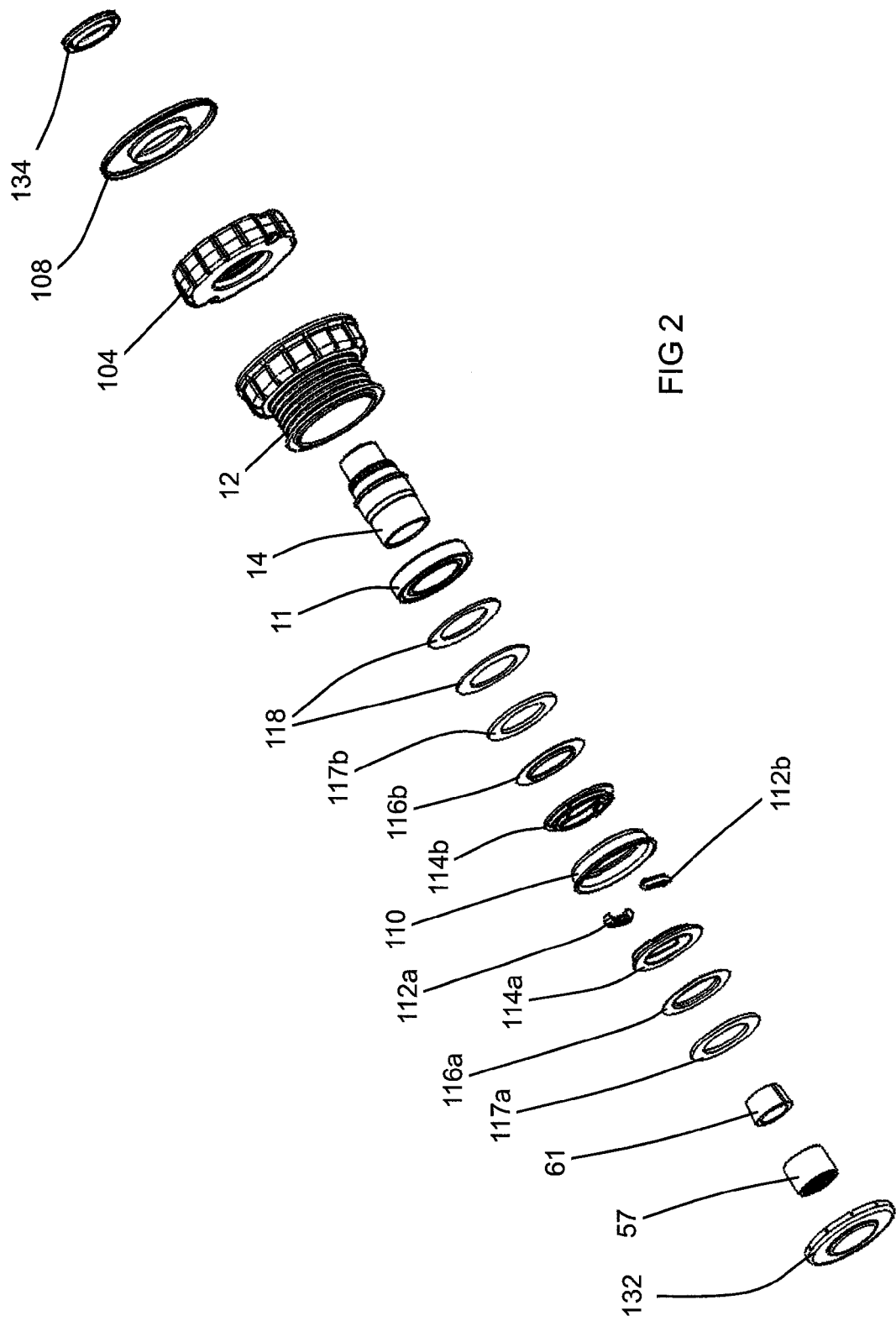
FIG. 2 is an exploded perspective view of the isolator shown in FIG. 1.

As seen in FIG. 2, the isolator 10 includes a rotary drive member 12 (which may for convenience be referred to as a pulley 12, but which may be any other suitable type of rotary drive member), a shaft adapter 14, at least one spring arrangement 16 (FIG. 3), and a position-based damping structure 18 (FIG. 2). Each spring arrangement 16 (FIG. 3) may include a single spring or multiple springs. In the embodiment shown in FIG. 3 it includes a first spring 17a and a second spring 17b nested within the first spring 17a. The first spring 17a may have a relatively lower spring rate (i.e. it may be softer) than the spring rate of the second spring 17b. In the embodiment shown there are two spring arrangements shown individually at 16a and 16b, however there could be more or fewer spring arrangements 16.

The spring arrangement elastically deforms to isolate the endless drive member 52 and the MGU shaft 53a from vibrations or other sudden changes in torque in one another. The springs 17a and 17b in the examples shown are arcuate, helical coil compression springs. However, any other suitable type of springs could be used, such as, for example, arcuate closed cell foam springs.

The first springs 17a are shown as being longer than the second springs 17b although it is optionally possible for the first and second springs 16a and 16b to have the same length. Each first spring 16a has a first end 40 and a second end 42.

Figure 4:
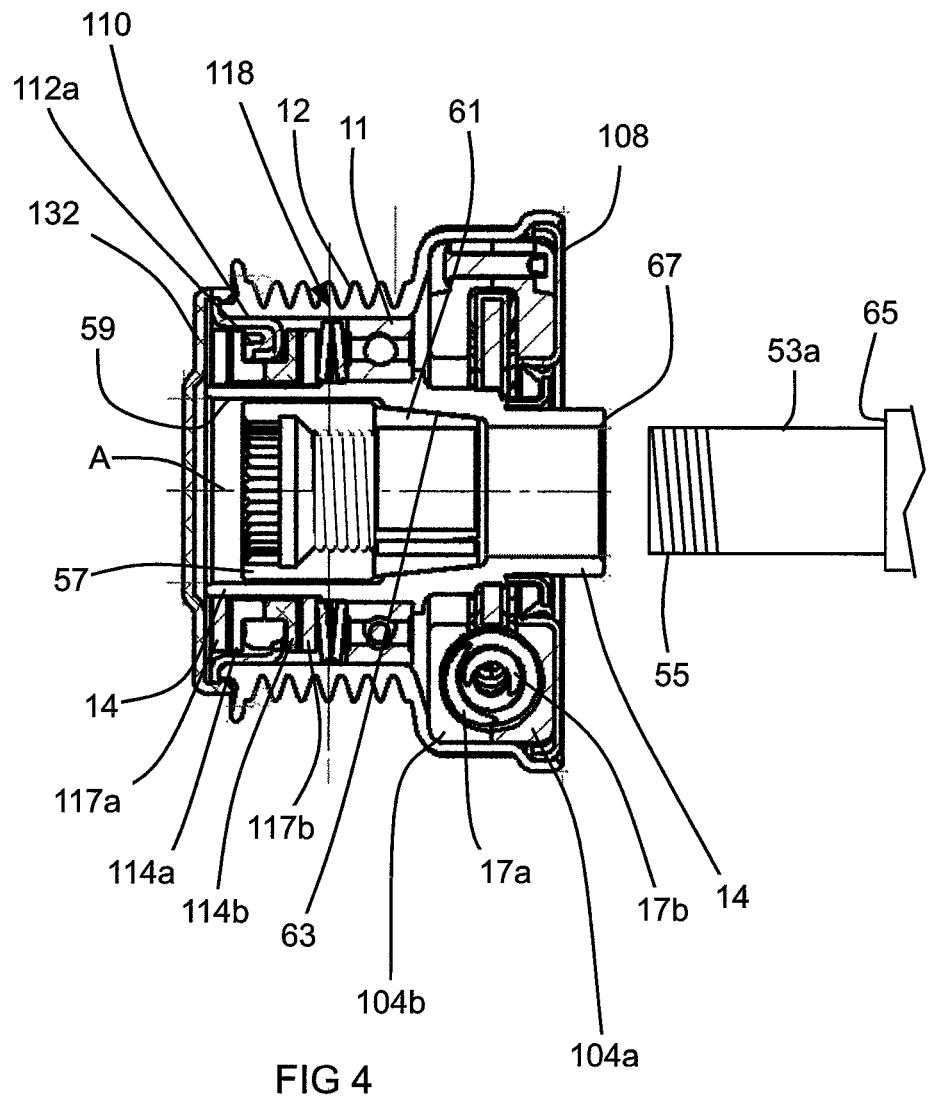
FIG. 4 is a sectional side view of the isolator shown in FIG. 1.

Referring to FIG. 4, the shaft adapter 14 is fixedly mountable in any suitable way to the MGU shaft 53a for rotation about an axis A. For example, the MGU shaft 53a may include a shaft end 55 that is threaded and that mounts to a nut 57 inside a bore 59 of the shaft adapter 54. A conical split bushing 61 is urged against an inner-conical surface 63 of the shaft adapter 14. A shoulder 65 on the shaft 53a abuts an end 67 of the shaft adapter 14. Threading the nut 57 on the shaft end 55 drives the split bushing 61 on the inner-conical surface 63 to urge gripping of the split bushing 61 on the shaft 53a. Alternatively any other mounting structure may be used.

Figure 5:
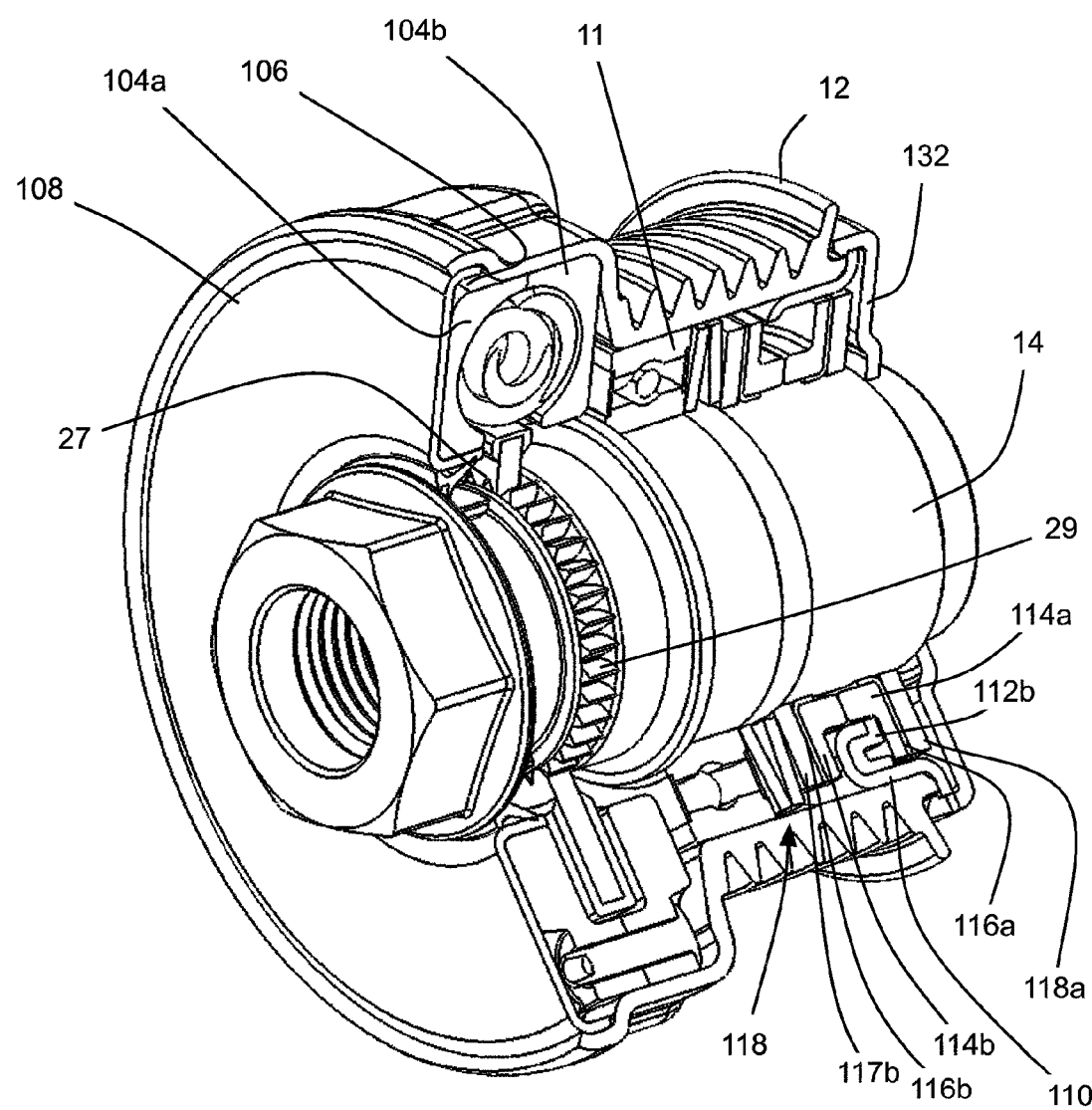
FIG. 5 is a perspective cutaway view of the isolator shown in FIG. 1.

Referring to FIG. 5, a driver 26 is fixedly mounted to the shaft adapter 14, e.g. by means of first teeth 27 on a central aperture 28 that engage second teeth 29 on an outer surface of the shaft adapter 14. The driver 26 has a central body 62, a first arm 12a and a second arm 12b. The driver 26 has a first adapter drive surface 64 on one side of the first arm 12a, which is engageable with the first spring end 40 of the first spring 16a and a second adapter drive surface 66 on one side of the second arm 12b, which is angularly spaced from the first adapter drive surface 64 by an adapter drive surface spacing S1, and which is engageable with the second spring end 42 of the first spring 16a. The driver 26 has another first adapter drive surface 64 on another side of the second arm 12b and a second adapter drive surface 66 on another side of the first arm 12a, which are angularly spaced from each other by the spacing S1 and which are engageable with the first and second spring ends 42 of the second spring 16b. While there are many first and second teeth 27 and 29 shown in the Figures, it will be understood that fewer teeth may be suitable in many cases.

The driver 26 may be made from any suitable material such as a suitable steel.

The pulley 12 is engageable with the belt 52 (FIG. 1) and is rotatably mounted to the shaft adapter 14 e.g. by means of a ball bearing 11 that directly supports the pulley 12 on the adapter 14, and by first and second bushings 102 positioned to indirectly support the pulley 12 on the adapter 14, so that the pulley 12 is rotatable relative to the shaft adapter 14.

Figure 3:
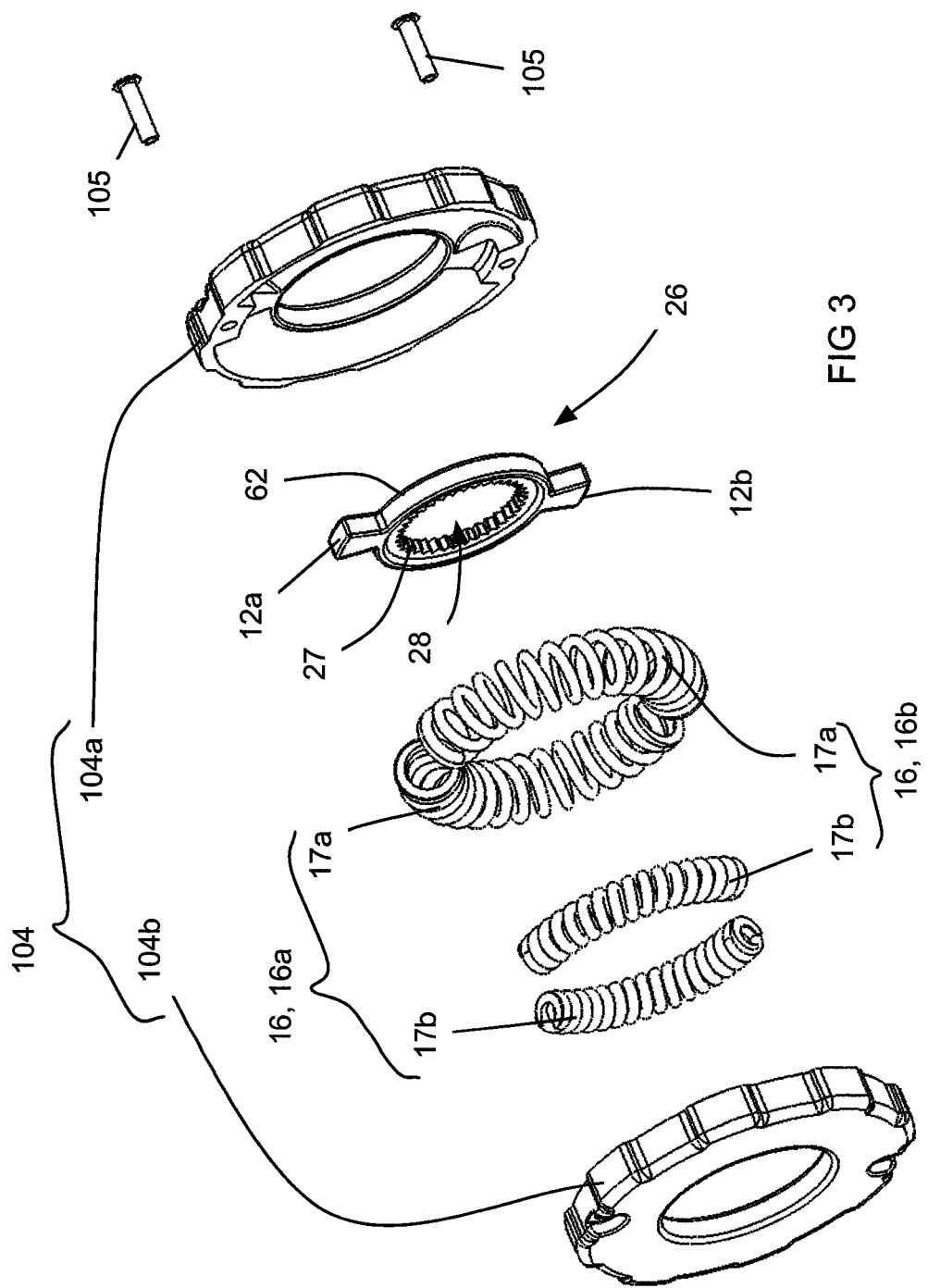
FIG. 3 is an exploded perspective view of a portion of the isolator shown in FIG. 1.

A spring shell 104 shown in FIGS. 2 and 3 may be provided to hold the springs 17a and 17b, and may be frictionally held in a chamber 106 (FIG. 5) in the pulley 12 that is covered by a cover member 108 so as to rotationally lock the spring shell 104 with the pulley 12. Additionally radial projections and valleys on the spring shell 104 that mate with corresponding radial valleys and projections on the pulley 12 may assist in locking the spring shell 104 rotationally with the pulley 12.

The spring shell 104 may be formed from two shell halves 104a and 104b which are joined together by rivets 105 (FIG. 3). The spring shell 104 may be made from any suitable material such as nylon impregnated with PTFE.

Figure 6:
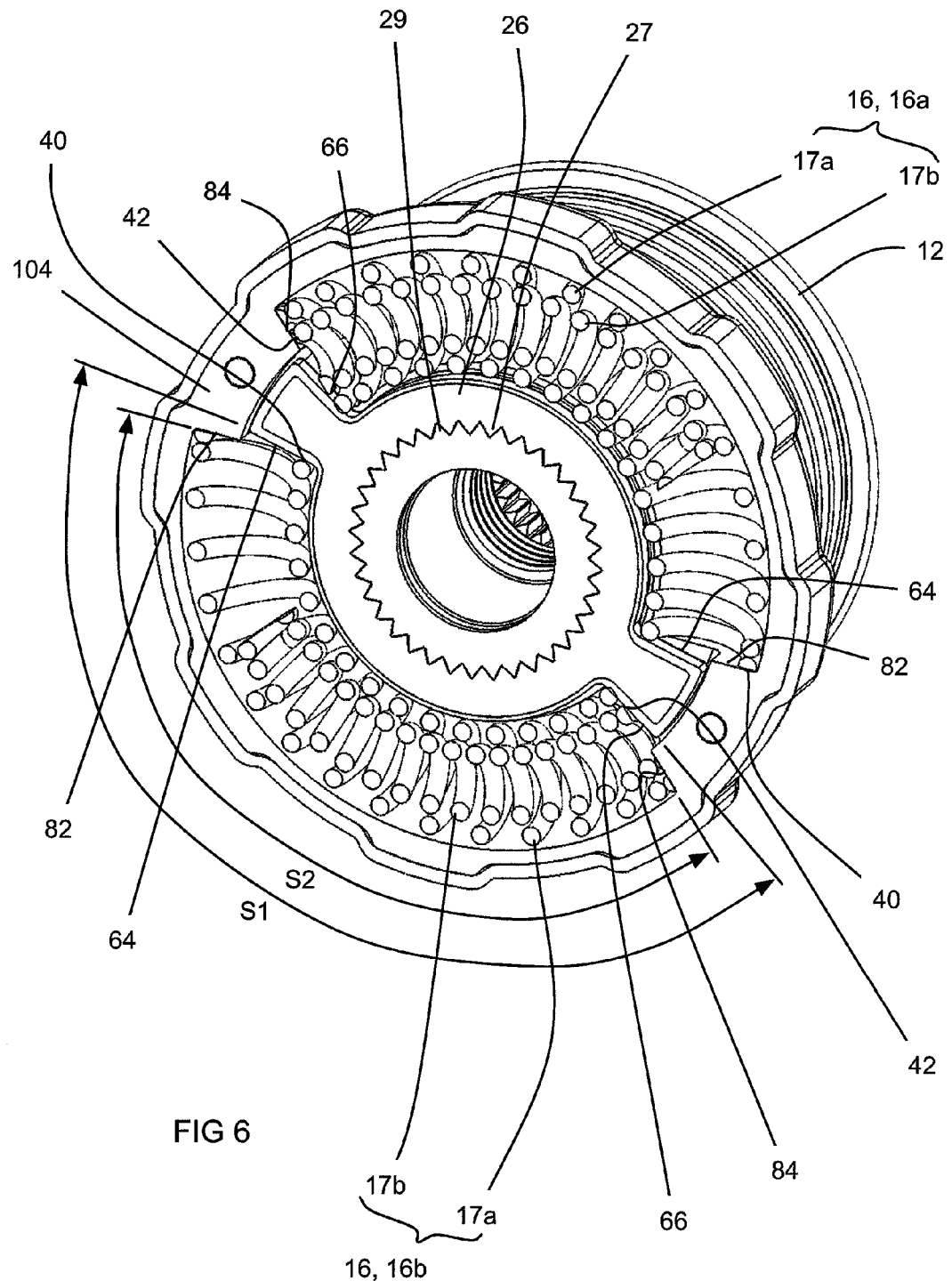
FIG. 6 is a perspective cutaway view of the isolator shown in FIG. 1, shown cut through a different plane than that shown in FIG. 5.

With reference to FIG. 6, a first pulley-associated drive surface 82 that is engageable with the first spring end 40 of the first spring arrangement 16a, and a second pulley-associated drive surface 84 that is angularly spaced from the first pulley-associated drive surface 82 by a pulley associated drive surface spacing S2, and that is engageable with the second spring end 42 of one of the spring arrangements 16. The pulley 12 has another first pulley drive surface 82 that is engageable with the first spring end 40 of the second spring arrangement 16b, and another second pulley drive surface 84 that is angularly spaced from the first pulley drive surface 86 (also by the spacing S2), and that is engageable with the second spring end 42 of the second spring arrangement 16b.

As can be seen in FIG. 6, one of the adapter and pulley drive surface spacings S1 and S2 is larger than the other of the adapter and pulley drive surface spacings S1 and S2. In the example embodiment shown in FIG. 6, the spacing S1 is larger than the spacing S2. However, it is alternatively possible for the spacing S1 between the adapter drive surfaces 64 and 66 to be smaller than the spacing S2 between the pulley drive surfaces 82 and 84.

As a result of having one spacing S1 or S2 be larger than the other, when transitioning from torque transfer from the shaft adapter 14 to the pulley 12 to torque transfer from the pulley 12 to the shaft adapter 14, the second adapter drive surfaces 66 engage the second spring ends 42 (via the end members 6b) at a different time than the first adapter drive surfaces 64 disengage from the first spring ends 40, and the second pulley drive surfaces 84 disengage from the second spring ends 42 at a different time than the first pulley drive surfaces 82 engage the first spring ends 40. Analogously, when transitioning from torque transfer from the pulley 12 to the shaft adapter 14 to torque transfer from the shaft adapter 14 to the pulley 12 the first adapter drive surfaces 64 engage the first spring ends 40 at a different time than the second adapter drive surfaces 66 disengage from the second spring ends 42, and the first pulley drive surfaces 82 disengage from the first spring ends 40 at a different time than the second pulley drive surfaces 84 and 88 engage the second spring ends 42. The difference in the gaps S1 and S2 may be less than about 10 degrees angularly. Providing a difference in the gaps S1 and S2 is further described in pending PCT application PCT/CA2014/000456, the contents of which are incorporated herein by reference in their entirety.

As a result of having one spacing S1 or S2 be larger than the other, when transitioning from torque transfer from the shaft adapter 14 to the pulley 12 to torque transfer from the pulley 12 to the shaft adapter 14, the second adapter drive surfaces 66 engage the second spring ends 42 at a different time than the first adapter drive surfaces 64 disengage from the first spring ends 40, and the second pulley drive surfaces 84 disengage from the second spring ends 42 at a different time than the first pulley drive surfaces 82 engage the first spring ends 40. Analogously, when transitioning from torque transfer from the pulley 12 to the shaft adapter 14 to torque transfer from the shaft adapter 14 to the pulley 12 the first adapter drive surfaces 64 engage the first spring ends 40 at a different time than the second adapter drive surfaces 66 disengage from the second spring ends 42, and the first pulley drive surfaces 82 disengage from the first spring ends 40 at a different time than the second pulley drive surfaces 84 and 88 engage the second spring ends 42.

In order to keep the kinetic energies of the impacts sufficiently low, the spacing difference is selected, based on one or more of several parameters (and preferably all of these parameters). The parameters include the moment of inertia of the pulley, the moment of inertia of the shaft adapter, the maximum amount of torque that the isolator 10 will be designed to transfer, the materials that make up the adapter drive surfaces 64 and 66 and the materials that make up the pulley drive surfaces 82 and 84.

Figure 7:
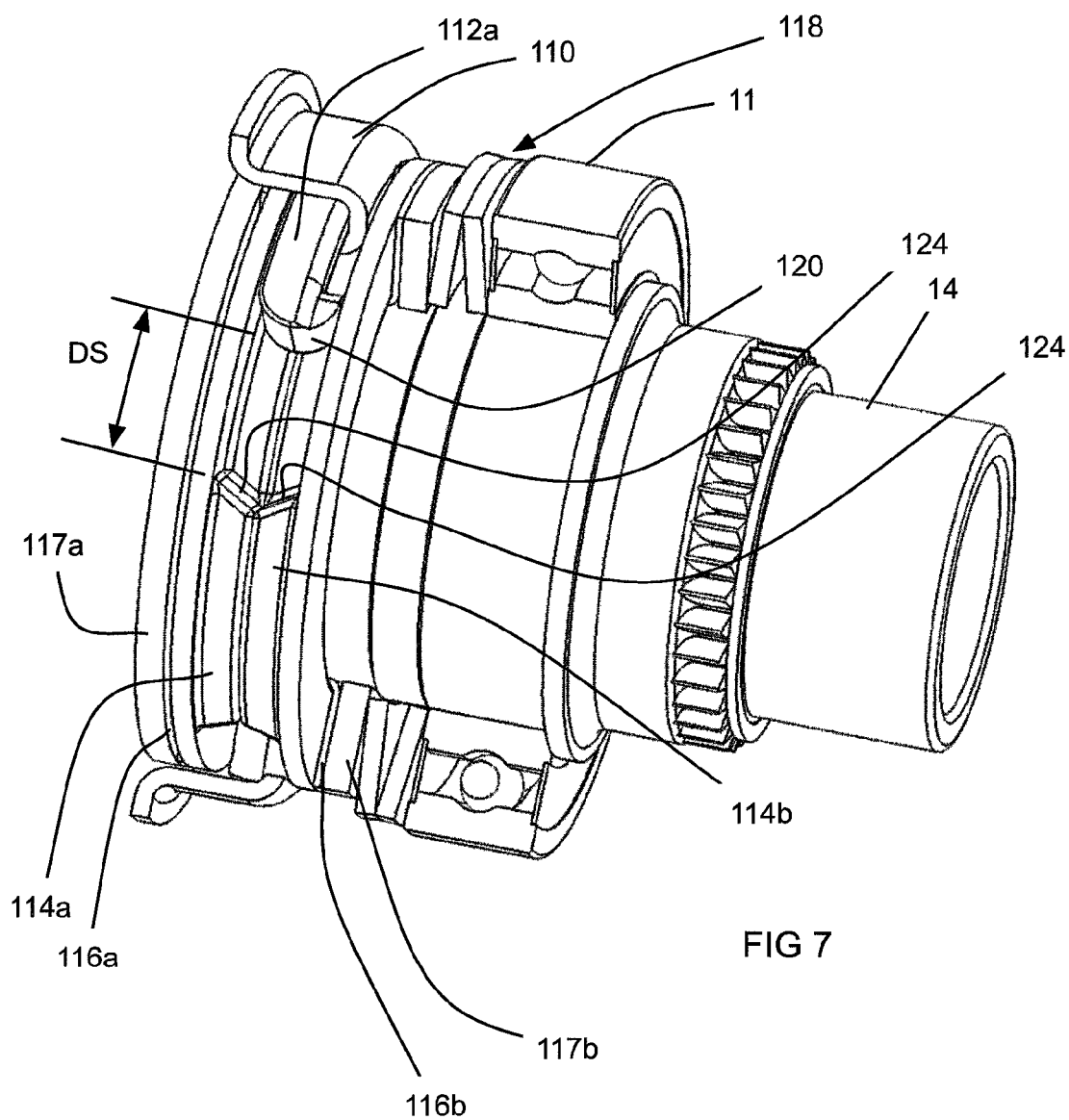
FIG. 7 is a perspective view of the isolator shown in FIG. 1 without a pulley thereon with a damping structure in a first position.
Figure 8:
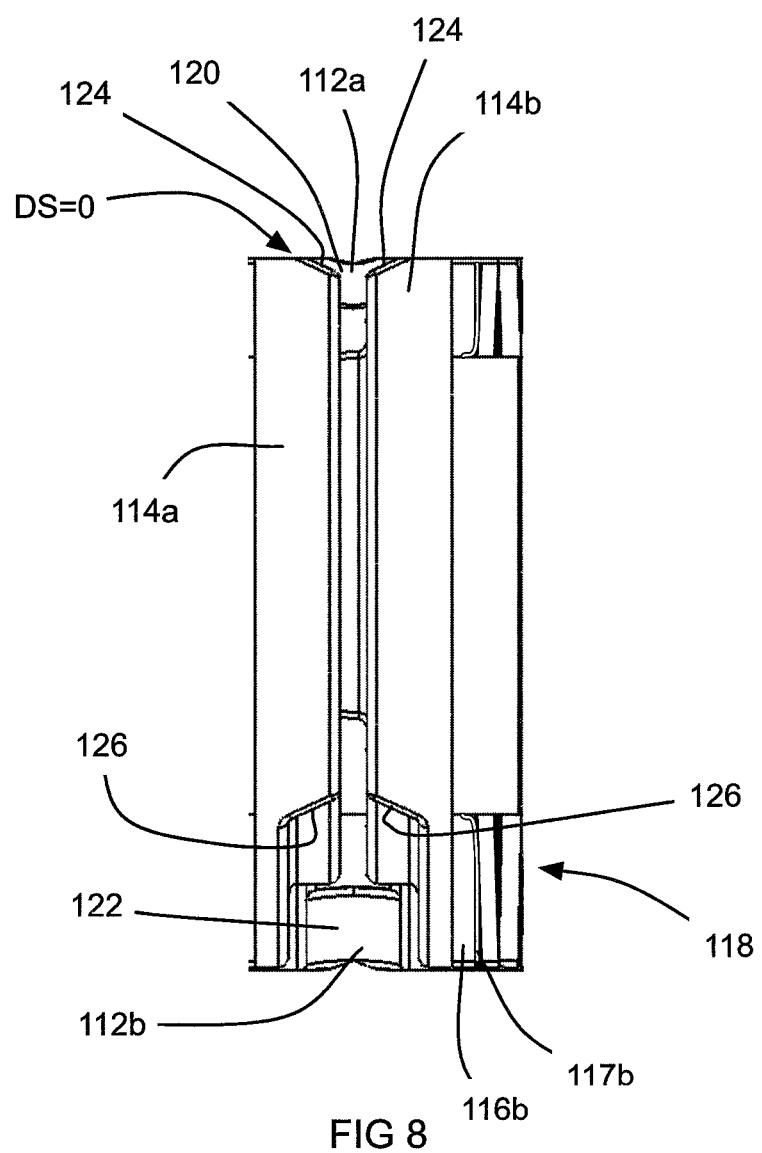
FIG. 8 is a perspective view of the isolator shown in FIG. 1 without a pulley thereon with the damping structure in a second position.

Referring to FIGS. 2 and 7, the damping structure 18 is configured to exert a damping force between the pulley 12 and the shaft adapter 14 within a selected angular range of positions. The damping structure 18 includes a damping structure driver 110 that has first and second spreader members 112*a* and 112*b* fixedly attached thereto, first and second force transfer members 114*a* and 114*b*, first and second friction members 116*a* and 116*b*, first and second thrust washers 117*a* and 117*b*, and a damping structure biasing arrangement 118. The damping structure driver 110 is rotationally fixed with the pulley 12. Referring to FIGS. 7 and 8, the spreader members 112*a* and 112*b* each have first and second spreader member engagement surfaces 120 and 122 thereon which are engageable with first and second force transfer member engagement surfaces 124 and 126 on each of the force transfer members 114*a* and 114*b*. The spreader member engagement surfaces 120 and 122 may be generally cylindrical in shape, while the force transfer member engagement surfaces 124 and 126 may be at any selected angle (such as, for example, about 45 degrees relative to the axis A) to transfer the circumferential movement of the spreader members 120 and 122 into axial movement of the force transfer members 114*a* and 114*b*. The axial movement of the force transfer members 114*a* and 114*b* causes compression of the biasing arrangement 118 which increases the normal force (and therefore the frictional damping force) between the thrust washers 117*a* and 117*b* and the friction members 116*a* and 116*b*. It will be understood that there is some axial play in the position of the driver 110 (and therefore the spreader members 120 and 122).

FIG. 7 shows the position of the spreader members 112*a* and 112*b* relative to the force transfer members 114*a* and 114*b* when the engine is idling. As can be seen, there is a selected spacing between the spreader members 112*a* and 112*b* and the force transfer members 114*a* and 114*b* when the engine is at idle. The spacing is represented by DS. The damping structure 18 is configured to provide a first damping force when the pulley 12 and the shaft adapter 14 are at a first relative position (shown in FIG. 7) corresponding to a spacing DS that is greater than zero. The first damping force may optionally be zero or it may be a selected non-zero damping force. The damping structure 18 is configured to provide a second damping force (that is greater then the first damping force) when the pulley 12 and the shaft adapter 14 are at a second relative position (shown in FIG. 8) that corresponds to a spacing DS that is zero (i.e. corresponding to engagement between the spreader members 112*a* and 112*b* and the force transfer members 114*a* and 114*b*).

The biasing arrangement 118 may include any suitable structure, such as a pair of Belleville washers that have one end in abutment with the bearing 11 (FIG. 7) and the other end in abutment with the thrust washer 117*b*.

Because the thrust washer 117*a*, the friction member 116*a* and the force transfer member 114*a* are essentially fixed in position, it will be noted that the spreader members 112 will be axially floating so as to ensure that they can adjust axially as necessary to remain centered axially between the force transfer members 114*a* and 114*b* so as to transfer force substantially equally into the force transfer members 114*a* and 114*b*.

Referring to FIGS. 2 and 4, a dust cover is shown at 132 for protecting the isolator internals from dust and debris. At the other axial end of the isolator 10, a seal member 134 is provided for sealing the space between the cover 108 and the shaft adapter 14.

Figure 9:
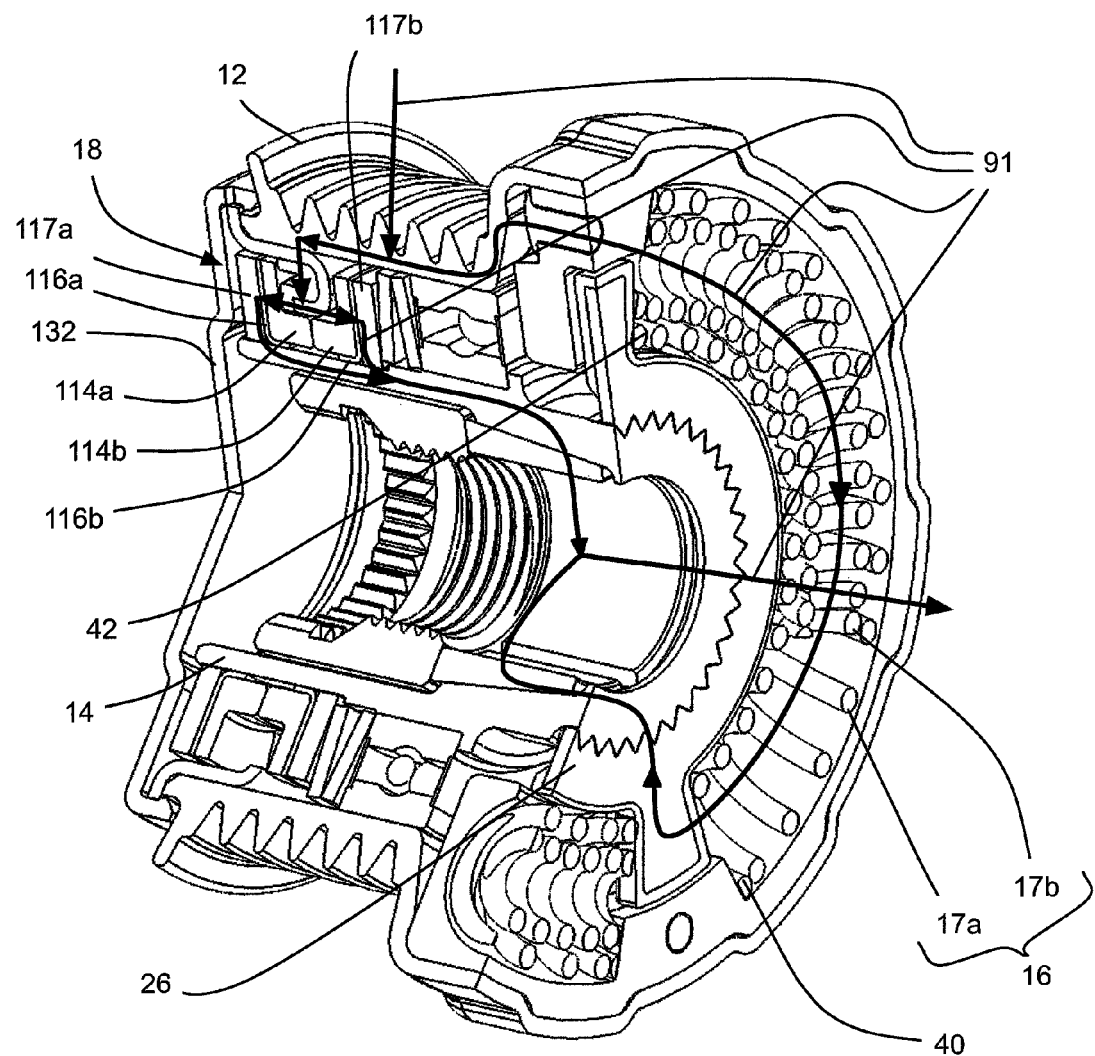
FIGS. 9 and 10 are cutaway perspective views of the isolator shown in FIG. 1 that show the torque path through the isolator under different conditions.

FIG. 9 shows the torque transfer (see arrows 91) from the pulley 12 to the shaft adapter 14, as would occur during a key start of the engine 51 (FIG. 1), which is a start of the engine 51 by the engine's starter motor, and not by the MGU 53. During such a start the relative angular movement between the pulley 12 and the shaft adapter 14 is sufficiently large that all of the spacing DS is taken up and the damping structure 18 is at the position shown in FIG. 8 so that some damping force is applied. As can be seen, in such a situation some of the torque is transferred from the pulley 12 to the spring arrangements 16 through the first spring ends 40, and from the spring arrangements 16 to the shaft adapter 14 through the second spring ends 42, while some of the torque is transferred from the pulley 12 frictionally through the damping structure 18 and from the damping structure 18 into the shaft adapter 14. In other words, the damping structure 18 is configured to transfer torque between the pulley 12 and the shaft adapter 14 in parallel with the isolation spring arrangements 16 but only in situations where the relative movement between the pulley 12 and the shaft adapter 14 is greater than a selected amount away from a neutral position (i.e. from the position when the engine is off). The selected amount of relative movement corresponds to the amount of torque transfer that takes place when the engine is started via the engine's starter motor (not shown) and when other large load changes occur. It will also be noted that the selected amount of relative movement is selected to prevent lock up of the spring arrangements 16 (i.e. it is selected to prevent the springs 17*a* and 17*b* from being compressed to the point where there is no longer any gap between their coils and they therefore 'go solid'), which can damage the springs 17*a* and 17*b*, and which can lead to binding of the springs 17*a* and 17*b* in these compressed positions.

Figure 10:
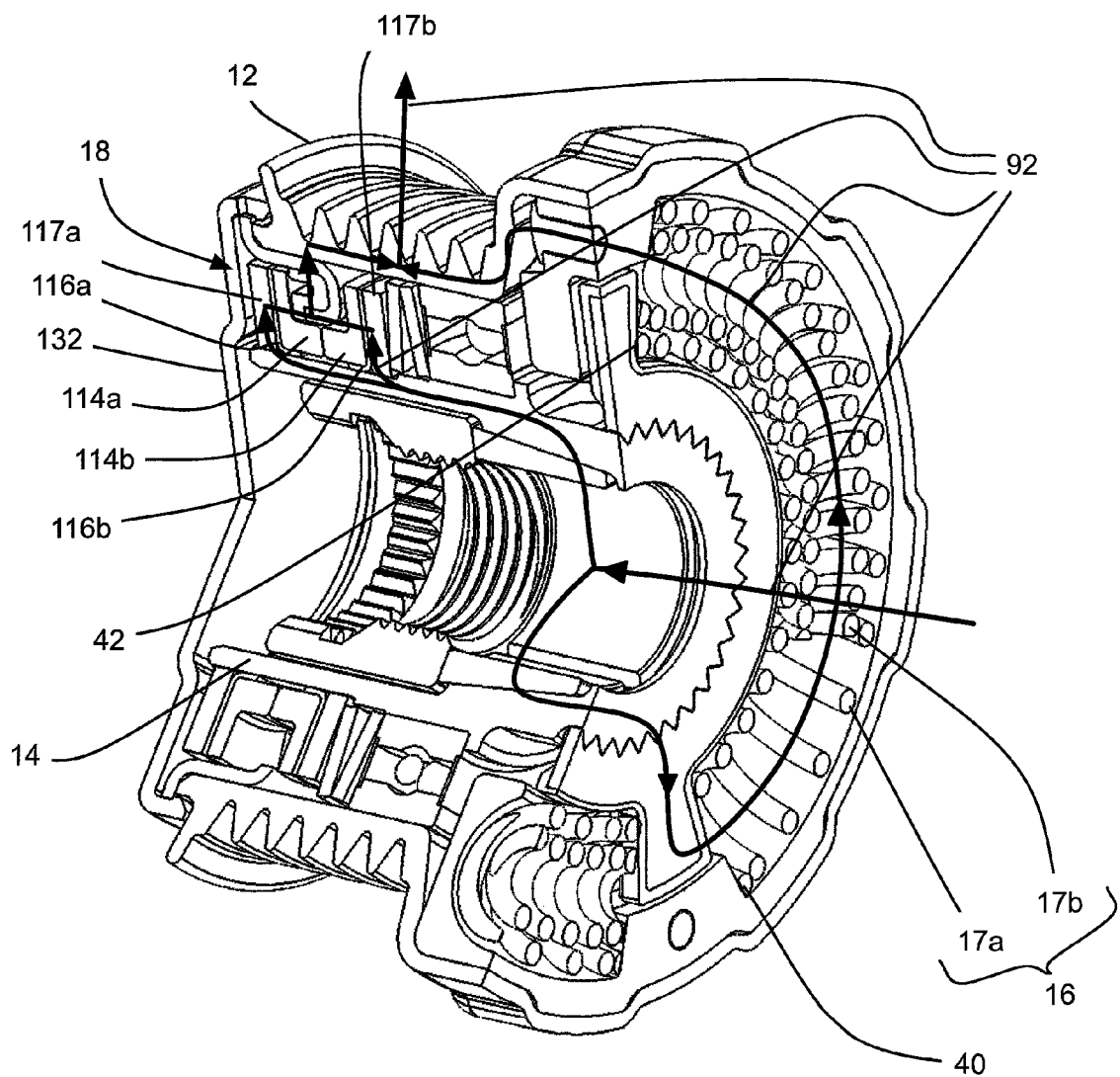

FIG. 10 shows the torque transfer that takes place in a mode where the MGU shaft 53*a* (FIG. 4) drives the pulley 12, (e.g. so as to transfer power to the engine's crankshaft 50*a* to start the engine in a BAS event). As can be seen, torque is transferred from the shaft 53*a* (not shown in FIG. 10) to the shaft adapter 14, and from the shaft adapter 14 torque is transferred in parallel through the spring arrangements 16 and through the damping structure 18 when more than a selected amount of relative movement has taken place between the pulley 12 and the shaft adapter 14. The torque path in FIG. 10 is essentially the reverse of the torque path shown in FIG. 9. Torque is transferred from the shaft adapter 14 to the spring arrangements 16 through the driver 26, and from the spring arrangements 16 to the pulley 12. When the aforementioned relative movement is sufficiently large, torque is also transferred from the shaft adapter 14 to the pulley 12 through the thrust washers 117a and 117b, the friction members 116a and 116b, the force transfer members 114a and 114b, the spreader members 112a and 112b and the damping structure driver 110.

Figure 11:
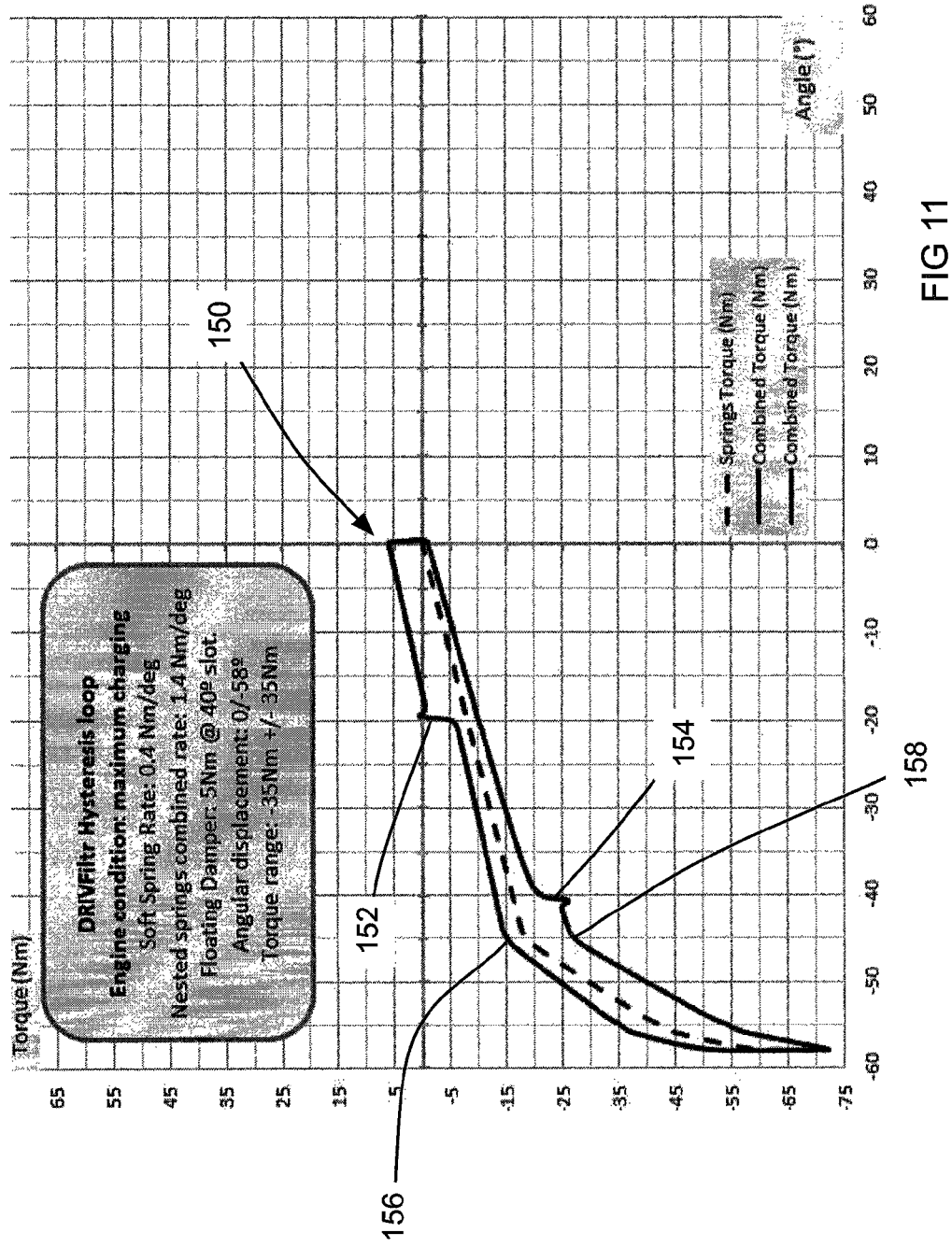
FIG. 11 is a graph illustrating the torque position relationship for the isolator shown in FIG. 1.

Reference is made to FIG. 11 which shows a torque transfer curve 150 for the isolator 10. Points 152 and 154 represent when the spacing DS is consumed and torque transfer begins to take place through the damping structure 18 in addition to taking place through the spring arrangements 16. As can be seen in FIG. 11, the selected amount of relative movement between the shaft adapter 14 and the pulley 12 before the damping structure 18 is engaged may be, for example, about 40 degrees. In the example shown in FIG. 11, points 156 and 158 represent when the second springs 17b start or stop contributing to the torque transfer.

It will be noted that the position-based damping structure 18 shown in FIGS. 6-10 is positioned to transfer torque via frictional damping force at a selected amount of relative movement between the rotary drive member 12 and the shaft adapter 14. The selected amount of relative movement is selected to be less than a permitted amount of flexure of the first isolation spring arrangement 16a. The amount of damping force may increase as the relative movement increases beyond the selected amount of relative movement (i.e. as the spreader members 112a and 112b further spread the force transfer members 114a and 114b apart, they cause progressively greater amounts of compression of the Belleville washers from biasing arrangement 118, which increases the damping force) sufficiently to prevent the spring arrangements 16 from going solid. In other words, the torque transfer increases through the damping structure 18 with displacement at a sufficiently high rate that the torque transfer exceeds the maximum torque that the isolator 10 is designed to handle. The amount of damping force may be high but is spread over a relatively large area, as the spreader members 112a and 112b drive frictional engagement of two friction members (members 116a and 116b) that span the circumference of the isolator 10, which is a relatively large area of engagement. This reduces the average temperature of the friction members 116a and 116b, which improves the longevity of the isolator 10.

By providing the damping structure 18 or 160, the isolator 10 can be used with arcuate helical compression springs 17a and 17b while ensuring that situations do not occur where the springs 17a and 17b go solid. Using arcuate helical compression springs is beneficial due to the relatively low axial height of the isolator 10.

Figure 12:
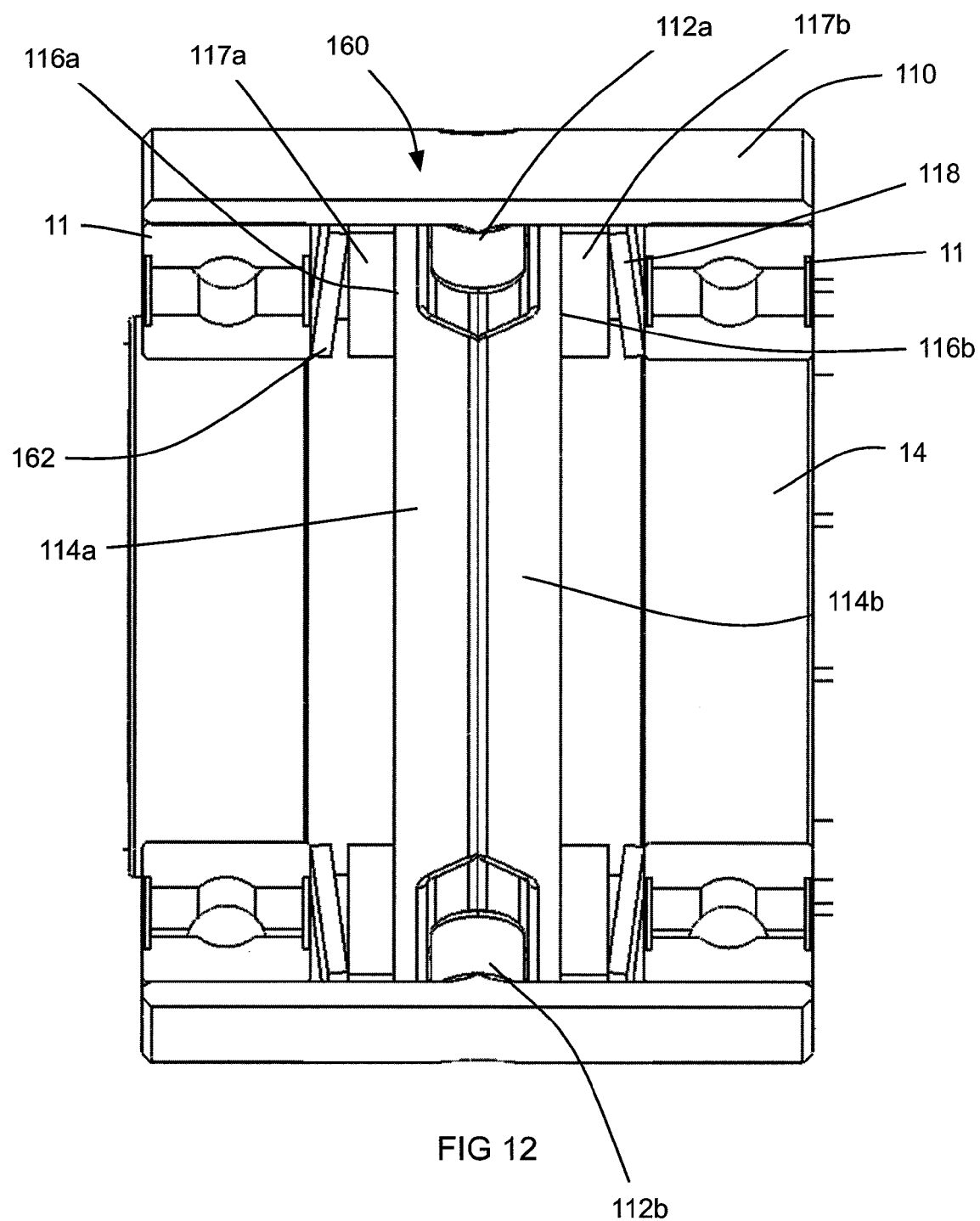
FIG. 12 is side elevation view of an alternative damping structure for the isolator shown in FIG. 1.

Reference is made to FIG. 12 which shows an alternative damping structure 160. The damping structure 160 may be similar to the damping structure 18, but includes a second damping structure biasing arrangement 162 so that the thrust washer 117a, the friction member 116a and the force transfer member 114a are not axially fixed in position but are instead axially movable and biased towards the force transfer member 114b, the friction member 116b and the thrust washer 117b. In this embodiment the spreader members 112a and 112b need not be axially movable—they can be fixed axially. This transfers the force more evenly into the first and second force transfer members 114a and 114b thereby producing more even damping forces on the two friction members 116a and 116b.

A second bearing 11 is shown in FIG. 12 also, for supporting the pulley on the shaft adapter. Additionally, the friction members of the embodiment shown in FIG. 12 may be coatings on the force transfer members 114a and 114b instead of being separate elements as they are in the embodiment shown in FIGS. 6-10.

While two springs 17a and 17b are shown for each spring arrangement 16, it will be understood that it is alternatively possible to only have one spring (e.g. spring 17a) in each spring arrangement 16.

While the above description constitutes a plurality of embodiments of the present invention, it will be appreciated that the present invention is susceptible to further modification and change without departing from the fair meaning of the accompanying claims.

The invention claimed is:

1. An isolator for isolating a device driven by an engine via an endless drive member, comprising:
   a shaft adapter that is connectable with a shaft of the device;
   a rotary drive member that is engageable with the endless drive member;
   a first isolation spring arrangement that is positioned to transfer torque between the shaft adapter and the rotary drive member; and
   a position-based damping structure that is positioned to transfer torque via a frictional damping force between the rotary drive member and the shaft adapter at a selected amount of relative movement therebetween, wherein the selected amount of relative movement is selected to be less than a maximum permitted amount of flexure of the first isolation spring arrangement;
   wherein the damping structure includes a first spreader member and first and second force transfer members, wherein the selected amount of relative movement between the rotary drive member and the shaft adapter drives the spreader member circumferentially into engagement with the force transfer members, which in turn transfer force from the spreader member into an axial force on first and second friction members respectively to generate the frictional damping force.

2. An isolator as claimed in claim 1, wherein the damping force increases with increased movement beyond the selected amount of relative movement between the shaft adapter and the rotary drive member.

3. An isolator as claimed in claim 1, wherein the device is an MGU.

4. An isolator as claimed in claim 1, wherein the first isolation spring arrangement includes a first arcuate helical compression spring.

5. An isolator as claimed in claim 4, wherein the first isolation spring arrangement includes a second arcuate helical compression spring nested within the first arcuate helical compression spring.

6. An isolator as claimed in claim 1, wherein the damping structure includes a second spreader member that is circumferentially opposite the first spreader member.

7. An isolator as claimed in claim 1, wherein one of the first and second force transfer members is fixed axially and wherein the first spreader member is movable axially.

8. An isolator as claimed in claim 1, wherein the first and second friction members are rings that extend circumferentially through 360 degrees.

9. An isolator as claimed in claim 1, wherein both the first and second force transfer members are movable axially and are biased towards each other.

10. An isolator for isolating a device driven by an engine via an endless drive member, comprising:
    a shaft adapter that is connectable with a shaft of the device;

a rotary drive member that is engageable with the endless drive member;
a first isolation spring arrangement that is positioned to transfer torque between the shaft adapter and the rotary drive member; and
a damping structure that is positioned to transfer torque via a frictional damping force between the rotary drive member and the shaft adapter at a selected amount of relative movement therebetween, wherein the damping structure includes a first spreader member and first and second force transfer members, wherein the selected amount of relative movement between the rotary drive member and the shaft adapter drives the spreader member circumferentially into engagement with the force transfer members, which in turn transfer force from the spreader member into an axial force on first and second friction members respectively to generate the damping force.

* * * * *